United States Patent [19]

Engman

[11] Patent Number: 4,513,832

[45] Date of Patent: Apr. 30, 1985

[54] WHEELED CHASSIS

[75] Inventor: Bo H. S. Engman, Sunds Bruk, Sweden

[73] Assignee: Permobil AB, Timra, Sweden

[21] Appl. No.: 491,012

[22] Filed: May 3, 1983

[30] Foreign Application Priority Data

May 3, 1982 [SE] Sweden ..................... 8202763

[51] Int. Cl.[3] ..................... B62D 61/10

[52] U.S. Cl. ..................... 180/6.5; 180/22; 180/907

[58] Field of Search ..................... 180/6.5, 22, 907; 280/242 WC

[56] References Cited

U.S. PATENT DOCUMENTS

| | | | |
|---|---|---|---|
| 3,506,079 | 4/1970 | Madler | 180/22 |
| 3,520,378 | 7/1970 | Slay | 180/22 X |
| 4,128,137 | 12/1978 | Booth | 280/242 WC |

FOREIGN PATENT DOCUMENTS

| | | | |
|---|---|---|---|
| 2810420 | 9/1978 | Fed. Rep. of Germany | 180/6.5 |
| 2342197 | 9/1977 | France | 180/22 |

*Primary Examiner*—John A. Pekar

*Attorney, Agent, or Firm*—James & Franklin

[57] ABSTRACT

A manoeuverable, motor-driven wheeled chassis includes a chassis structure carrying two pairs of support wheels ($N_1$, $M_1$) separated in the longitudinal direction of the chassis. Between the pairs of support wheels there is a pair of drive wheels ($L_1$). The chassis structure includes a first frame structure ($P_1$, 14) carrying a first pair of support wheels ($N_1$) and the pair of drive wheels ($L_1$), and a second frame structure ($O_1$, 10) carrying the second pair of support wheels ($M_1$) and vertically pivotably connected to the first frame structure (at K). The wheeled chassis is primarily intended for use as a wheelchair (2,4,6).

12 Claims, 6 Drawing Figures

WHEELED CHASSIS

BACKGROUND OF THE INVENTION

The present invention relates to a manoeuvrable, motor-driven wheeled chassis, including a frame structure carrying two pairs of freely journalled support wheels separated in the longitudinal direction of the chassis, between said wheels there being arranged a pair of drive wheels.

The invention thus relates to a motor-driven wheeled chassis for vehicles of different kinds, e.g. wheelchairs, wheeled beds, trucks etc. In the following, the invention will be described primarily in relation to wheelchair applications.

The main object of the present invention is to provide a wheeled chassis which moves very flexably over irregularities in the substructure on which it travels, e.g. thresholds when used indoors, and stones or other ground irregularities when used outdoors, the vehicle itself only executing insignificant movements vertically.

A further object of the invention is to provide a chassis with six wheels which are turnable substantially about one vertical axis.

SUMMARY OF THE INVENTION

These objects are achieved with a wheeled chassis of the kind described in the introduction and characterized in that the chassis structure includes a first frame structure carrying a first pair of support wheels and the pair of drive wheels, and a second frame structure pivotably connected to the first structure in the vertical direction, and carrying the second pair of support wheels.

In accordance with a more developed embodiment of the invention, the wheeled chassis is implemented such that the wheels in one support wheel pair are vertically movable, independent of each other. The ability of the chassis to move over an irregular substructure is thus further improved, without the movement over these irregularities being transmitted to the part of the vehicle supported by the chassis.

A wheeled chassis is thus provided by the invention, e.g. in applications for wheelchairs, such that by its flexibility it has the ability of assimilating to an essential degree the irregularities in the substructure, so that these do not give rise to shaking or other uncomfortable tipping movements in the chair itself, whereby comfort is improved. Although the welded chassis has this flexibility, it has at the same time the necessary stiffness for providing the chassis with the required rigidity.

According to a still further advantageous embodiment of the inventive wheeled chassis, the longitudinal members of the second frame structure have set screws for adjusting the maximum permitted movement of these members relative the first frame structure. These set screws are adjusted to the maximum permitted movement of the longitudinal members of the second frame structure, e.g. to the height of the thresholds in the premises where the chassis is to be used. When applied to a wheelchair, this maximum permitted movement namely determines the size of the forward or backward tipping movement which can be carried out by the chair itself, and thus it is a considerable advantage to be able to limit the size of this movement to the actual need.

BRIEF DESCRIPTION OF THE DRAWINGS

An embodiment of the wheeled chassis in accordance with the invention, applied to a wheelchair, will now be described in detail as an example, with reference to the appended drawings, on which

DETAILED DESCRIPTION OF THE PREFERRED EMBODIMENTS

Figure 1:
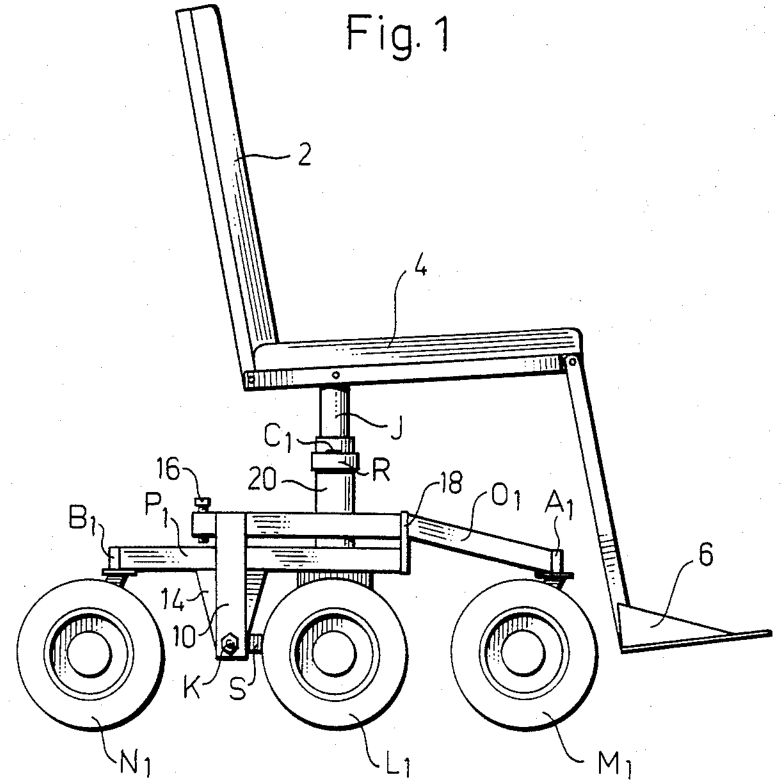
FIG. 1 is a side view of a wheelchair with the wheeled chassis in accordance with the invention.
Figure 2:
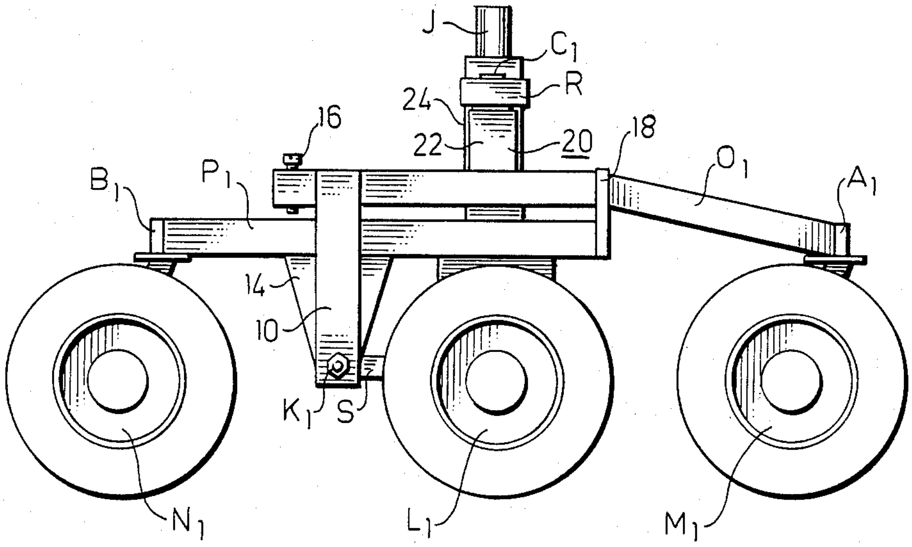
FIG. 2 illustrates the embodiment in FIG. 1 to a larger scale and with the chair itself removed.
Figure 3:
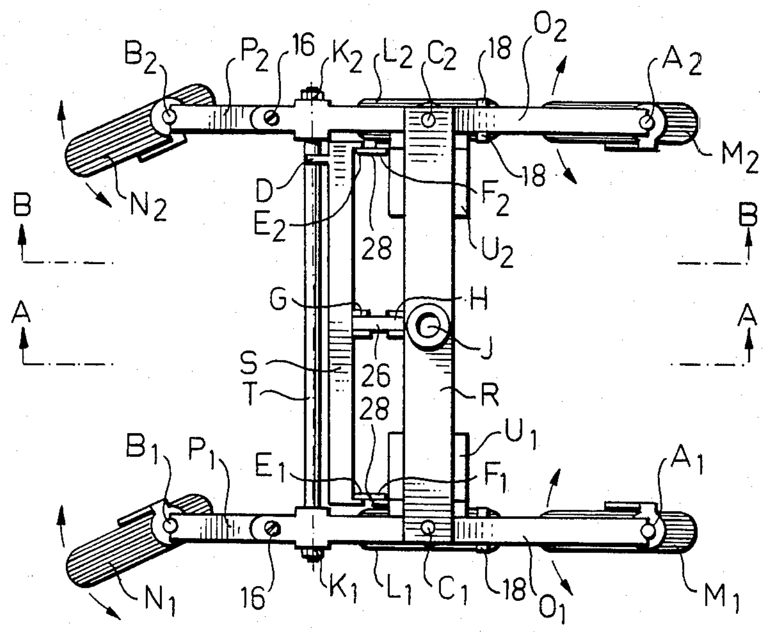
FIG. 3 is a plan of the embodiment illustrated in FIG. 2 and seen from above.
Figure 4:
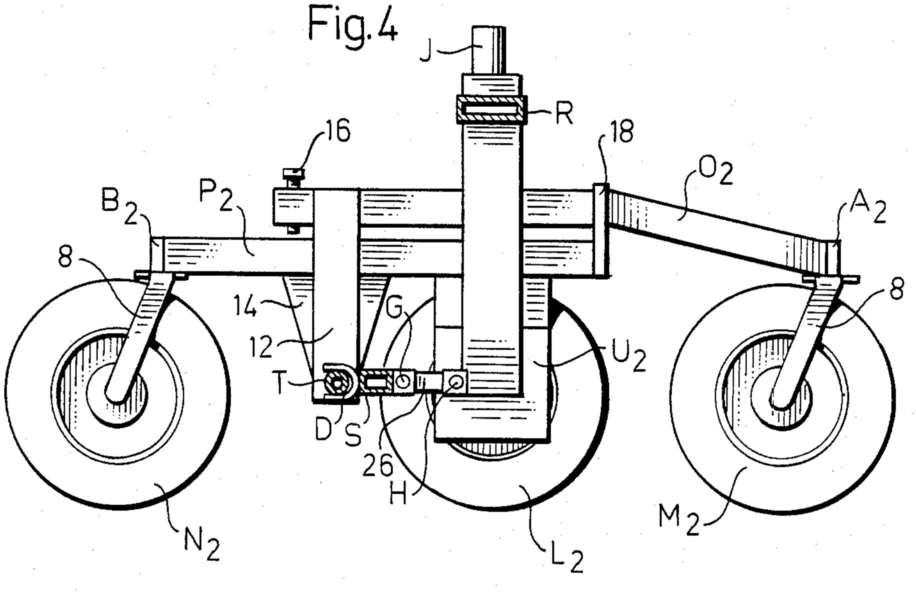
FIG. 4 is a section along the line A—A in FIG. 3.
Figure 5:
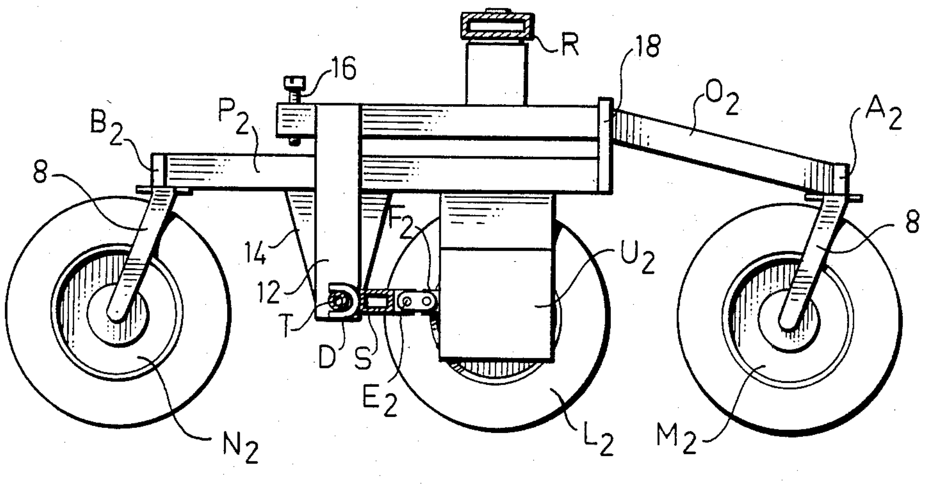
FIG. 5 is a section along the line B—B in FIG. 3
Figure 6:
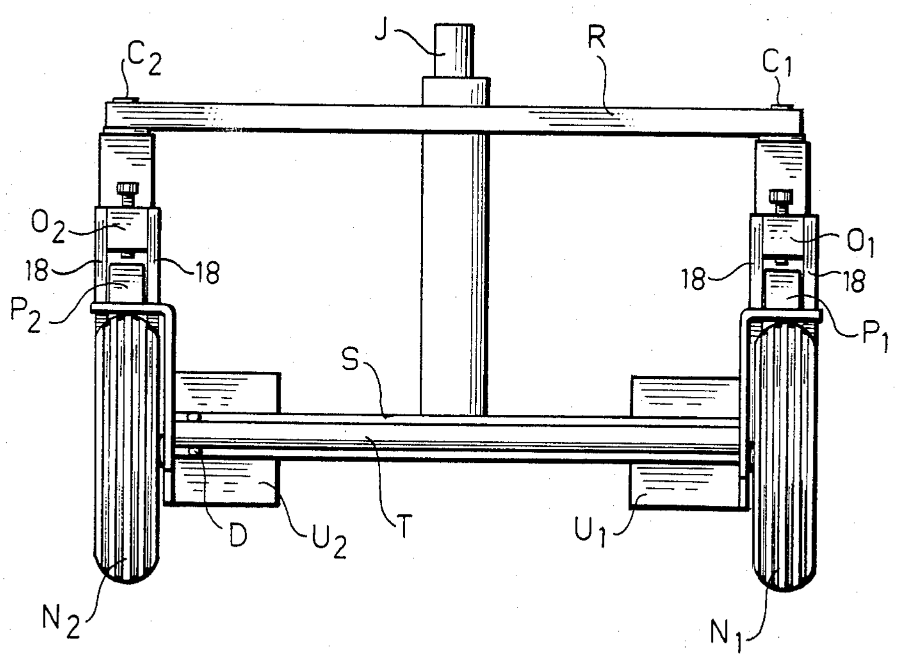
FIG. 6 is an end view of the wheeled chassis seen from the left in FIG. 5.

A wheelchair with a wheeled chassis in accordance with the invention is illustrated in FIG. 1. The chair itself comprises a back support 2, a seat pad 4 and a foot rest 6. The chair itself is carried by a tubular chair fastening J which is attached to a transverse member R at $C_1$. The member R is in turn carried by the chassis structure, as will be described in detail below.

The wheeled chassis includes a chassis structure with a support wheel $M_1$, $M_2$, $N_1$, $N_2$ arranged at each corner.

The support wheels $M_1$, $M_2$, $N_1$, $N_2$ are of the rotatable caster type, carried by an attachment means 8, which is attached to the chassis structure freely swivelable about a vertical axis at $A_1$, $A_2$, $B_1$, $B_2$. As will be seen from FIGS. 1-5, the journalling point for swiveling the attachment means 8 is displaced in relation to the rotational axis of the wheels $M_1$, $M_2$, $N_1$, $N_2$.

A pair of drive wheels $L_1$, $L_2$ is arranged between the support wheels $M_1$, $M_2$, $N_1$, $N_2$. The drive wheels $L_1$, $L_2$ are non-swivelably attached to the chassis structure in a way which will be described in detail below.

The chassis structure itself includes two frame structures.

The first frame structure comprises two longitudindal members $P_1$, $P_2$, each carrying a support wheel and a drive wheel $N_1$, $L_1$ and $N_2$, $L_2$, respectively.

The second frame structure similarly includes two parallel, longitudinal members $O_1$, $O_2$ carrying support wheels $M_1$ and $M_2$ at their ends.

The longitudinal members $O_1$ and $O_2$ are arranged to be partially immediately above a portion of the longitudinal members $P_1$ and $P_2$, respectively, of the first frame structure, and at the end portion of the respective longitudinal member $O_1$, $O_2$ opposite to the end carrying the support wheels $M_1$, $M_2$ there are attached two dependent side members 10 and 12. A similarly dependent side member 14 is attached to each of the longitudinal members $P_1$ and $P_2$ of the first frame structure between the support wheels $N_1$, $N_2$ and the drive wheels $L_1$, $L_2$. When the chassis structure is assembled, the pair of side members 10, 12, of the longitudinal members $O_1$, $O_2$ is mounted on either side of the side members 14 of the longitudinal members $P_1$, $P_2$ and pivotably connected at the lower ends of the side members with the aid of a through shaft K. The longitudinal members $O_1$, $O_2$ are thus pivotable in the vertical direction relative to the longitudinal members $P_1$, $P_2$ about this shaft K, so that the ends of the members $O_1$, $O_2$ carrying the support wheels $M_1$ and $M_2$ can rise when the support wheel in question moves over a projection on the substructure. The amount of pivoting is determinable by a set screw 16 arranged at the side members 10, 12 on the longitudinal members $O_1$, $O_2$. The maximum permitted pivoting of the longitudinal members $O_1$, $O_2$ should be adjusted so that it is not greater than necessary, since it would otherwise enable an unnecessarily large backward or forward rocking movement of the chair itself.

For controlling the vertical turn of the members $O_1$, $O_2$ each of said members extends between two guide pins 18 which are vertically arranged at one end of the members $P_1$, $P_2$. The longitudinal members $O_1$, $O_2$ are angled at the location of this guidance to compensate for placing these members above the longitudinal members $P_1$, $P_2$ of the first frame structure, so that all wheels are normally substantially at the same level.

The shaft arrangement connecting both frame structures includes a tube T in which there runs a shaft K mounted in a glide bearing, so that the longitudinal members $P_1$, $O_1$ on one side of the chassis structure have some movability relative the longitudinal members $P_2$, $O_2$ on the other side of the structure, thus providing flexibility to the chassis structure as a whole.

Attachments 20 for the transverse member R are arranged on the longitudinal members $O_1$, $O_2$. As will be seen best from FIG. 2, each of these two attachments comprises a cylindrical rubber body 22 attached to one of the longitudinal members $O_1$ or $O_2$ at one end, its other end being attached to the transverse member R. The rubber body 22 is surrounded by a metal sleeve 24 attached to one of the members $O_1$, $O_2$. There is thus obtained a flexible attachment of the transverse member R to the longitudinal members $O_1$ and $O_2$, which enables some relative vertical movement between the members $O_1$ and $O_2$. The metal sleeve 24 allows the rubber body to yield solely in the axial direction of the body but not laterally, which is of decisive importance for attaching the chair to the transvere member R while obtaining the necessary stability of the chair.

There is a fastening J for the chair at the centre of the member R. This fastening J is tubular and attached to the member R, extending through said member and a distance below it, its bottom portion pivotably connected to the end H of a link 26, the other end G of which is pivotably connected to a transverse support member S, see FIGS. 3 and 4. The support member S is hollow with a rectangular cross section, as will be seen in FIGS. 4 and 5. The ends of the member S are pivotably connected to one end $E_1$, $E_2$ of links 28, the other ends $F_1$ and $F_2$, respectively, being pivotably connected to fastenings rigidly attached to the housings of drive motors $U_1$ and $U_2$. To keep the support member S in position, it is formed with a fork D engaging round the tube T, see FIGS. 3–6. The support member S is thus prevented from pivoting downwards and serves to effectively steady the seat fastening J so that the necessary stability is obtained for the seat itself.

Drive means in the form of two drive motors $U_1$, $U_2$ are arranged on either side of the chassis structure close to the drive wheels $L_1$, $L_2$. The drive motors are attached to the longitudinal members $P_1$ and $P_2$ of the first frame structure. The drive motors $U_1$, $U_2$ are suitably electric motors driven by batteries (not shown), similarly carried by the frame structure. The motors are adapted such that they can either drive both drive wheels $L_1$, $L_2$ in the same direction, forwards or backwards, for driving the chair straight forwards or straight backwards, or the wheels can be driven in opposite directions for turning the wheelchair substantially about a vertical axis, thereby enabling the wheelchair to turn in either direction.

A drive means (not shown) can similarly be arranged to raise or lower the seat fastening J for altering the height of the chair.

As will be apparent from the above description of an embodiment, the wheeled chassis in accordance with the invention includes a plurality of articulations having a certain amount of movement also in other directions than the direction of turning or pivoting, so that the chassis obtains smooth flexibility. To advantage these articulations can comprise ball and socket joints.

I claim:

1. A maneuverable, motor-driven wheeled chasis, including a chassis structure carrying pairs of freely mounted support wheels separated in the longitudinal direction of the chassis, and a pair of drive wheels arranged between said support wheel pairs, characterized in that said chassis structure includes a first frame structure carrying a first pair of said support wheels and said pair of drive wheels, and a second frame structure pivotably connected to said first frame structure for movement in the vertical direction and carrying a second pair of said support wheels; said first frame structure including two parallel independently movably connected longitudinal members and said second frame structure similarly including two parallel independently movably connected longitudinal members connected at their ends to said first frame structure such that they are individually pivotable relative to it.

2. Chassis as claimed in claim 1, characterized in that the longitudinal members of the second frame structure are at their ends connected to the first frame structure by a transverse shaft structure, which is pivotably attached to side members rigidly connected to the longitudinal members of the frame structures, the longitudinal members of the second frame structure being pivotable relative the first frame structure about said shaft structure.

3. Chassis as claimed in claim 2, characterized in that each of the longitudinal members of the first frame structure constitutes a single straight member, while each of the longitudinal members of the second frame is formed by two straight portions forming an obtuse angle to each other, one portion being arranged above the corresponding longitudinal member of the first frame structure, and normally extending substantially parallel thereto, while the other portion of the member slopes downwards towards the first frame structure to keep the support wheel carried by the end of the member at substantially the same level as remaining wheels, the portion of the members of the second frame structure arranged above the longitudinal members of the first frame structure, having at their end portions two dependent side members extending on either side of similarly dependent side members attached to the longitudinal members of the first frame structure, between the first pair of support wheels and the drive wheels, said shaft structure extending through said side members.

4. Chassis as claimed in claim 2 or 3, characterized in that the shaft structure includes a tube, inside which a shaft arranged in a glide bearing extends, for pivotable fixation of the longitudinal members relative to each other, and for pivotable connection of the second frame structure to the first frame structure.

5. Chassis as claimed in claim 2 or 4, characterized in that the longitudinal members of the second frame structure are guided between a pair of vertical guide pins upstanding from the longitudinal members of the first frame structure.

6. Chassis as claimed in claim 2 or 3, characterized in that the longitudinal members of the second frame structure have set screws for adjusting the maximum amount of pivoting about the shaft structure relative to the first frame structure.

7. Chassis as claimed in claim 1, characterized in that means for driving the drive wheels are carried by the first frame structure and adapted such that the two drive wheels are drivable in the same direction, forwards or backwards, or in opposite directions for swiveling the chassis substantially about a vertical axis to enable optional alteration of the travelling direction of the vehicle.

8. Chassis as claimed in claim 1, intended for a wheelchair, characterized in that a transverse member extends between the longitudinal members of the second frame structure for carrying a chair seat, said transverse member being pivotably mounted on the longitudinal members of the second frame structure.

9. Chassis as claimed in claim 8, characterized in that the chair seat is carried by a tubular seat fastening attached to the transverse member, and extending therethrough, the lower portion of said tubular fastening being pivotably connected to a transverse support member pivotably connected to the longitudinal members of the first frame structure for preventing the chair from tipping forwards or backwards.

10. Chassis as claimed in claim 9, characterized in that the support member is arranged such that, with the aid of the shaft structure, it is prevented from displacement.

11. Chassis as claimed in any of claims 8 through 10, characterized in that the transverse seat support member is attached to each of the longitudinal members of the second frame structure by means including a rubber body attached at one end to the transverse member and at its other end to the longitudinal member, said body being surrounded by a metal sleeve attached to the longitudinal member to enable relative movement between the second frame structure and the transverse member solely in the axial direction of the rubber body.

12. Chassis as claimed in claim 1 wherein said first pair of said support wheels is disposed rearwardly of said second pair of support wheels in the longitudinal direction of the chassis.

* * * * *